United States Patent [19]

Bennett

[11] Patent Number: 5,004,285
[45] Date of Patent: Apr. 2, 1991

[54] SUN-SHIELD

[76] Inventor: Mark Bennett, 29992 Deerfield, New Baltimore, Mich. 48047

[21] Appl. No.: 479,049

[22] Filed: Feb. 12, 1990

[51] Int. Cl.⁵ .................................................. B60J 3/00
[52] U.S. Cl. ..................................... 296/1.1; 296/97.7; 160/84.1; 160/370.2
[58] Field of Search ............... 296/97.6, 97.7, 97.8, 296/95.1; 160/370.2, 84.1

[56] References Cited

U.S. PATENT DOCUMENTS

| | | | |
|---|---|---|---|
| 4,652,039 | 3/1987 | Richards | 296/97.7 |
| 4,763,947 | 8/1988 | Gregg | 296/97.7 |
| 4,777,994 | 10/1988 | Nederveld | 296/97.7 |
| 4,848,825 | 7/1989 | Niernberger | 296/95.1 |
| 4,877,074 | 10/1989 | Castellano | 296/97.8 |

Primary Examiner—Robert R. Song
Attorney, Agent, or Firm—Weintraub DuRoss & Brady

[57] ABSTRACT

A foldable sun-shield is for use in a mini-van having wing window panels adjacent to the windshield, each wing window panel being disposed between the windshield and a door window. The foldable sun-shield includes a front panel, and two side panels. The front panel is made of a plurality of foldable panels. Each side panel forms an acute angle relative to the longitudinal edge of the front panel. The acute angles are about the same as the inclined angle between the windshield and the horizontal plane. One side panel covers one wing window panel, and the other side panel essentially covers the other wing window panel.

6 Claims, 1 Drawing Sheet

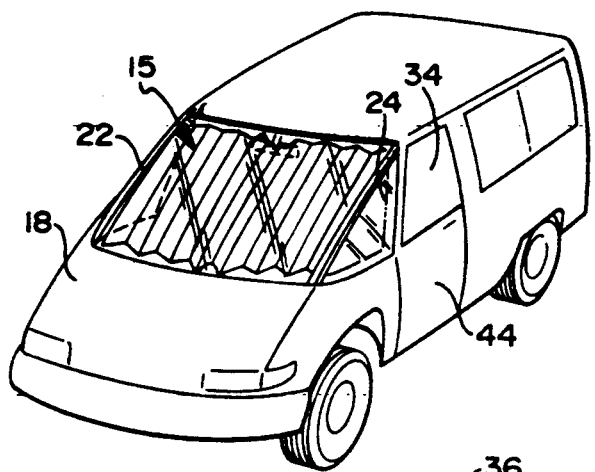
FIG 1
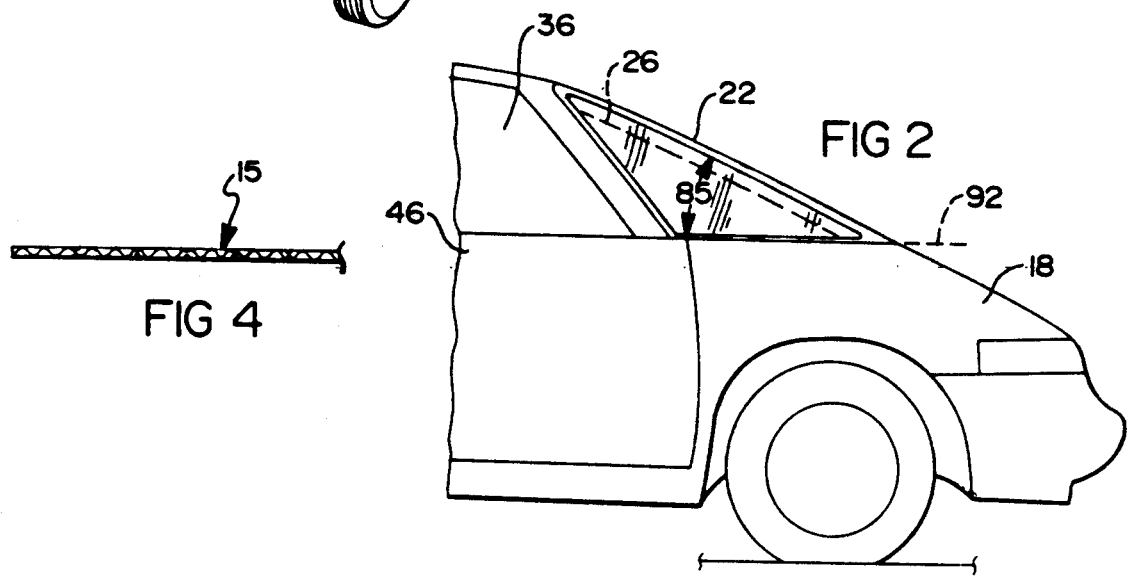
FIG 2
FIG 4
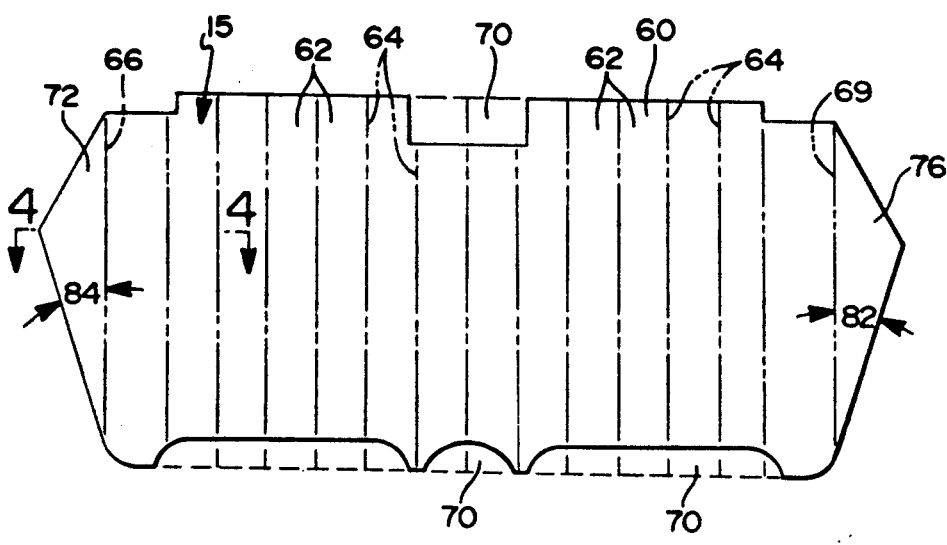
FIG 3

SUN-SHIELD

BACKGROUND OF THE INVENTION

1. Field of the Invention

The present invention relates to sun-shields for protecting the interior of a motor vehicle against sun damage while preventing a heat buildup inside the motor vehicle. More particularly, the present invention relates to sun-shields for mini-vans, and the like.

2. Prior Art

In order to make motor vehicles more fuel-efficient to conserve our dwindling fuel supply, and to comply with governmental regulations, it has become necessary to aerodynamically design the exterior lines of the vehicle. As the slope of the windshield is increased, the wind resistance of the vehicle is improved. Wrap-around windows, which heretofore have eliminated the need for wing window panels, are being replaced by windshields with steeper inclines. To accommodate the steeper incline of the windshield, wing window panels have been re-introduced to reduce the width of the vehicular side doors, and thus, creating more glass in the vehicle.

The steep incline of the windshield and the greater glass area has more surface area exposed to the sun, thereby increasing the temperature inside the passenger compartment, which endangers the interior of the vehicle, and causes extreme discomfort for passengers entering the vehicle.

Thus, sunscreens, to protect and shield the interior have been developed. For example, U.S. Pat. No. 4,202,396 (Levy) discloses a sun-shield for covering the windshield of automobiles, which comprises a plurality of planar rectangular elements. The sunshield may be retained against the windshield either by the rear view mirror, or the sun-visors. As a result of the shape of the sun-shield, numerous gaps exist around the perimeter of the windshield, the windshield gaps defeating the purpose and minimizing the effectiveness of the sun-shield.

To provide optimal protection from the sun, the shape of the sun-shield must match the shape of the windshield, with minimal gaps between the sun-shield and the windshield to minimize the amount of glass exposed to the rays of the sun. By having the sun-shield secured either to the rear-view mirror or the sun visor, gaps are inherent between the top of the sun-shield and the body of the vehicle. Moreover, the prior art sun-shield doesn't address the wing windows.

What is needed is a sun-shield that minimizes exposure of the interior of the vehicle to the sun, while not interfering with the passenger's access to the vehicle, and which is useful with wing window paneled vehicles.

SUMMARY OF THE INVENTION

The foldable sun-shield of the present invention is specifically designed for use on a mini-van or a similar type motor vehicle having wing window panels, each wing window panel being disposed between the windshield and a door window. The wing window panels are each disposed between the windshield and a door window, and are each stationary relative to the door of the vehicle.

The foldable sun-shield hereof includes a front panel, and two, opposed side panels. The front panel is made of a plurality of foldable panels that are generally foldable in an accordion-like manner along the longitudinal edges of the foldable panels. The front panel is preferably made of a generally rigid and opaque material, such as cardboard. The sun-shield preferably includes a plurality of punch-out portions to enable the sun-shield to custom fit the interior contours of the vehicle.

Each side panel is preferably pre-cut at an acute angle relative to the longitudinal edge of the front panel. The acute angles are about the same as the inclined angle between the windshield and the horizontal plane.

For a more complete understanding of the sun-shield of the present invention, reference is made to the following detailed description and accompanying drawings in which the presently preferred embodiment of the invention is illustrated by way of example. As the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 is an environmental view of the sun-shield of the present invention in use in a mini-van motor vehicle;

FIG. 2 is a side view of the mini-van motor vehicle of FIG. 1 showing the sun-shield in position against the vehicle windshield;

FIG. 3 is an exploded, perspective view of the sun-shield of the present invention; and FIG. 4 is an end view of the sun-shield of FIG. 3.

DESCRIPTION OF THE PREFERRED EMBODIMENT

Referring now the drawings, FIG. 1 discloses an environmental view of the foldable sun-shield 15 of the present invention disposed within a vehicle 18 such as a mini-van. The motor vehicle 18 preferably includes two opposed wing window panels 24 and 26, which are each disposed between the windshield 22 and a side door window 34 and 36. The wing window panels 24 and 26 are preferably stationary relative to the swingable doors 44 and 46 of the vehicle 18; that is, neither wing window panel 24 and 26 is part of the door panel 44 and 46.

The sun-shield 15 (FIG. 3) includes a front panel 60, and two side panels 72 and 76, the front panel 60 being divided into a plurality of foldable panels 62. The front panel 60 is generally foldable in a accordion-like manner along the longitudinal edges 64 of the plurality of foldable panels 62. The front panel 60 is preferably made of a generally rigid and opaque material, such as cardboard (see FIG. 4). The overall height of the front panel 60 is generally the same as the height of the windshield 22. The width of the front panel 60 in the unfolded position is essentially the same as the width of the windshield 22. The front panel 60 preferably includes a plurality of punch-out portions 70 (see FIG. 3) to enable the front panel 60 to custom fit the interior contours of the motor vehicle 18.

The side panels 72 and 76 are foldably affixed to opposite ends of the front panel 60, and, preferably, the opposite ends 66 and 69 are, generally, parallel to the longitudinal edges 64 of the front panel 60.

As shown in FIG. 3, the side panels 72 and 76 are preferably tapered at an acute angle relative to the longitudinal edge 64 of the front panel 60. The acute angle 82 and 84 of each side panel 72 and 76 are generally equal to each other. Both of the acute angles 82 and 84 are preferably the same as the inclined angle 85 between the windshield 22 and a horizontal plane 92. The matching of these angles is necessary to enable the sun-shield 15 to rest close to the windshield 22. As shown in FIG. 2, preferably each side plane 72 and 76 essentially covers each wing window panel 24 and 26. This arrangement not only protects more of the glass surrounding the passenger compartment from the rays of the sun and the heat generated therefrom, but also is useful in supporting the sun-shield against the windshield during prolonged periods when the vehicle is parked and exposed to the sun.

To install the sunshield 15 of the present invention in the parked vehicle 22, the punch-out portions 70 of the sunshield 15 are removed to watch the dashboard and the windshield 22 of the vehicle 18. The sunshield 15 is retained against the windshield 22 either by the rearview mirror centrally disposed relative to the vehicle 18, or by the windshield flaps disposed inside the vehicle 18 above each side of the windshield 22. The side panels 72 and 76 of the sun-shield 15 are folded and preferably mounted upon the vehicle dashboard.

While the sun-shield 15 has been described in conjunction with a specific embodiment, it is evident that many alternatives, modifications, and variations will be apparent to those skilled in the art in light of the disclosure herein. It is intended that the metes and bounds of the invention be determined by the appended claims rather than by the language of the above specification, and that all such alternatives, modifications, and variations which form a functional or conjointly cooperative equivalent are intended to be included within the spirit and scope of these claims.

I claim:

1. A foldable sun-shield for use with a vehicle, the vehicle having a windshield, a dashboard, and two wing window panels, each wing window panel being disposed along each side of the vehicle and disposed in an essentially vertical orientation the windshield being disposed at an inclined angle relative to a horizontal plane, the sun-shield comprising:
   (a) a front panel comprising a plurality of foldable panels, the foldable panels being generally foldable along longitudinal edges thereof, the front panel being made of a generally rigid and opaque material, the front panel having a length substantially equal to the height of the windshield, the front panel having an unfolded position and a folded position, the width of the front panel in the unfolded position being essentially as wide as the windshield;
   (b) a first and a second side panel each having a length and a height, the first side panel being foldable affixed to an end of the front panel, the second side panel being foldable affixed to an end of the front panel opposite the first side panel, and,
   wherein each side panel is mountable upon the top of the dashboard, thereby supporting the sun-shield in a position adjacent to the windshield.

2. The sunshield of claim 1, wherein the first side pane is generally the same size as the first wing window panel, and the second side panel is generally the same size as the second wing window panel.

3. The sun-shield of claim 1, wherein each side panel has an angle relative to a longitudinal edge of the front panel that is essentially the same as the inclined angle between the windshield and the horizontal plane.

4. The sun-shield of claim 1, wherein the sunshield includes a plurality of punch-out portions to custom fit the interior contours of the vehicle.

5. A foldable sun-shield for use with a mini-van vehicle, the mini-van vehicle having a windshield, a dashboard, a door, and a wing window panel, a wing window panel being disposed on each side of the mini-van vehicle between the windshield and a door window, each wing being stationary relative to the door of the mini-van vehicle, the windshield being disposed at an inclined angle relative to a horizontal plane, each wing window panel being disposed in an essentially vertical orientation, the sun-shield comprising:
   (a) a front panel being generally foldable in an accordion-like manner along longitudinal edges, the front panel being made of a generally rigid and opaque material; and
   (b) a first and a second side panel each being foldably affixed to an end of the front panel, the second side panel being foldably affixed to an end of the front panel opposite the first side panel, each side panel having an angle relative to a longitudinal edge of the front panel that is essentially the same as the inclined angle between the windshield and the horizontal plane, each side panel being positionable upon the top of the dashboard thereby enabling the suns-shield to be supportable adjacent to the windshield.

6. The sun-shield of claim 5, wherein the sunshield includes a plurality of punch-out portions to custom fit the interior contours of the vehicle.

* * * * *